(12) United States Patent
Bach et al.

(10) Patent No.: US 7,604,542 B2
(45) Date of Patent: Oct. 20, 2009

(54) TORSIONAL VIBRATION DAMPER

(75) Inventors: Hartmut Bach, Schweinfurt (DE); Thomas Dögel, Bad Kissingen (DE); Igor Kister, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 217 days.

(21) Appl. No.: 11/409,186

(22) Filed: Apr. 21, 2006

(65) Prior Publication Data

US 2006/0247065 A1 Nov. 2, 2006

(30) Foreign Application Priority Data

Apr. 23, 2005 (DE) .................. 10 2005 018 954

(51) Int. Cl.
*F16D 3/80* (2006.01)
(52) U.S. Cl. ....................................... 464/27; 464/68.3
(58) Field of Classification Search ................. 464/68.3, 464/68.91, 24, 27; 74/573.11; 192/208
See application file for complete search history.

(56) References Cited

U.S. PATENT DOCUMENTS

| 3,837,181 | A | * | 9/1974 | Leuenberger | ........... | 192/208 X |
|---|---|---|---|---|---|---|
| 4,173,158 | A | * | 11/1979 | Geislinger | | |
| 5,078,246 | A | | 1/1992 | Rohs et al. | | |
| 5,083,980 | A | | 1/1992 | Focoueur et al. | | |
| 5,307,710 | A | | 5/1994 | Feldhaus et al. | | |
| 6,050,380 | A | * | 4/2000 | Peinemann et al. | .... | 464/68.3 X |
| 6,491,149 | B1 | | 12/2002 | Kundermann et al. | | |
| 2003/0233907 | A1 | | 12/2003 | Hong | | |

FOREIGN PATENT DOCUMENTS

| DE | 39 31 026 | 4/1990 |
|---|---|---|
| DE | 41 28 868 | 3/1993 |
| DE | 198 08 729 | 9/1999 |
| DE | 102 56 191 | 1/2004 |
| EP | 0 400 508 | 12/1990 |
| KR | 10 2003 0061 | 7/2003 |
| KR | 1020030061179 A | * 7/2003 |

OTHER PUBLICATIONS

Kavanah, P., Brief Review in Chemistry, second edition, Cebco Standard Publishing, Fairfield, NJ, 1974, p. 9.*

* cited by examiner

*Primary Examiner*—Greg Binda
(74) *Attorney, Agent, or Firm*—Cohen Pontani Lieberman & Pavane LLP (57) ABSTRACT

A torsional vibration damper includes a drive-side transmission element connected to a drive and a takeoff-side transmission element, which can deflect rotationally with respect to the drive-side element. A damping device is installed between the two transmission elements and transmits torque between the drive-side transmission element and the takeoff-side transmission element. The damping device has a gas spring system with a reservoir containing a gaseous medium. The reservoir of the gas spring system is connected to a pressure circuit which allows, at least when there is a change in the torque to be transmitted by the gas spring system, adjustment of pressure in the reservoir to adapt the characteristic of the gas spring system to a new torque.

34 Claims, 9 Drawing Sheets

TORSIONAL VIBRATION DAMPER

BACKGROUND OF THE INVENTION

The invention pertains to a torsional vibration damper having a drive-side transmission element; a takeoff-side transmission element, which can deflect rotationally with respect to the drive-side element around an essentially identical axis of rotation; and a damping device, installed between the two transmission elements.

U.S. Patent Application Publication No. 2003/233907 discloses a torsional vibration damper wherein the drive-side transmission element is connected to a drive such as the crankshaft of an internal combustion engine, whereas the takeoff-side transmission element can be brought into working connection with a takeoff such as a gearbox input shaft by way of a clutch device, such as an engageable and disengageable friction clutch. So that torque can be transmitted between the drive-side transmission element and the takeoff-side transmission element, the damping device is provided both with a gas spring system, having a plurality of gas springs, and a supplemental spring system, containing a plurality of steel springs. When torsional vibrations occur, the steel springs are deformed and thus convert hard jolts into a softer vibration process in the known manner. The gas springs are responsible for a damping process which absorbs the energy of the jolts. For this purpose, each of the gas springs has a reservoir containing a gaseous medium such as air inside a cylinder space. When the gas spring is compressed and thus the volume of the reservoir is decreased, the gaseous medium is forced out of the reservoir through a throttle opening. Of course, when the load on the gas spring is released and thus the volume of the reservoir increases again, fresh gaseous medium is drawn back in from the environment through the throttle opening. This makes it possible to achieve velocity-proportional damping without any special sealing requirements.

The pressure in the reservoir and thus the damping behavior of the known gas spring system are the result of the deformation state at the moment in question. This gas spring system is therefore referred to in engineering circles as a "passive" system. The throttle opening is designed for all conceivable load states and therefore represents only a compromise. Steel springs suffer from the same problem, namely, that certain compromises must be made when adapting their spring characteristics to the different load states which occur during operation.

To remedy this problem in the case of steel springs, U.S. Pat. No. 5,307,710 describes the possibility of arranging a plurality of springs in a row in the circumferential direction and of providing the individual steel springs with different characteristics, so that, when small torques are introduced, only the steel springs with lower characteristics are compressed, whereas, when larger torques are introduced, the steel springs with the higher characteristics will be compressed as well. The problem here, however, is that steel springs are affected by the rpm's of the damper. That is, their turns are forced radially outward by centrifugal force, and they can then become immobilized in this radial position. Torsional vibrations therefore do not necessarily lead to the compression of the steel spring which is adjacent in the direction in which the torsional vibration is introduced, which means that the damping device may not provide any damping effect at all at first. Only an even higher load state will finally be able to break the steel spring loose from the radially outer immobilized position, which will be perceived in the vehicle as an unpleasant jerk. The circumferentially adjacent steel spring, however, which can be designed with a higher characteristic, will then also be deflected outward and initially immobilized until it, too, is broken loose from its radially outer contact position under the effect of an even higher load state. When a torsional vibration damper operates in this way, therefore, the overall result is that only a certain percentage of the spring system, never the entire volume, is available. The severity of this problem can be reduced but not eliminated by the sliding elements proposed in U.S. Pat. No. 5,307,710, which are inserted between the steel springs and their radially outer contact points. The quality with which torsional vibration dampers of this type isolate vibrations is therefore inadequate, and because of the high stiffnesses in the damping device, they have a resonance frequency in an rpm range which is present relatively often when a vehicle is being driven. Especially critical here is the lower range between 1,000 and 2,000 rpm when at the same time engine torques are high and the torsional vibrations which are being excited are correspondingly strong. Under such conditions, humming noises are heard in the vehicle.

SUMMARY OF THE INVENTION

The invention is based on the task of designing a damping device for a torsional vibration damper in such a way that undesirable humming noises can be avoided even under extreme conditions.

According to an embodiment of the invention, the reservoir of a gas spring system is connected to a pressure circuit, so that an "active" gas spring system is created. This makes it possible to readjust the pressure present in the reservoir when the torque to be transmitted by the gas spring system changes and thus to adapt the characteristic of the gas spring system to the new torque as needed. In engineering circles, a distinction is made between a "fully active" and a "partially active" gas spring system. In the case of a fully active gas spring system, an adjustment is made immediately by supplying gaseous medium to the reservoir or by removing it from the reservoir whenever the driving situation causes a change in the engine torque. In the case of a partially active gas spring system, however, an adjustment occurs only when there is a major change in engine torque. Otherwise, the gas spring system operates without any adjustments in a manner comparable to a passive gas spring system. Partially active gas spring systems thus perform a much smaller number of control processes than fully active systems, and the associated demand for a fast adjustment speed is also reduced. As a result, partially active systems offer the advantage of being able to work with slower flow velocities than fully active systems during the displacement of gaseous medium between the pressure circuit and the reservoir. Partially active gas spring systems are also characterized by low energy consumption and require only limited reservoir capacity for gaseous medium or perhaps no such capacity at all. The power of the pump used in a partially active gas spring system can also be low. For example, about 500 watts can be sufficient to operate the pump.

The characteristic of the gas spring system is preferably adapted to a change in torque by readjusting the pressure present in the reservoir of the gas spring system as a function of conditions which are relevant to the vehicle or to the driving situation. If the pressure circuit works here with an open-loop or closed-loop control device, referred to in the following simply as a "control system", then this control system can, for example, rely on operating points stored in the vehicle control system. In this manner, the pressure circuit supplies the reservoir with a gaseous medium such as air at a rate which is always appropriate to the specific conditions relevant to the vehicle or to the driving situation. The characteristic of the gas spring system is adjusted in each case on the basis of the positive pressure thus built up in the reservoir versus the environment of the torsional vibration damper. As a result, whatever the value of the torque which may be introduced into the torsional vibration damper—during operation in pull mode, the torque introduced by a drive such as the crankshaft of an internal combustion engine, or, in the case of operation in push mode, the torque introduced by a takeoff such as a gearbox input shaft—a spring characteristic corresponding to that torque will always be available in the gas spring system. Accordingly, at least most if not all of the compression distance of the gas spring system is available at all times. The characteristics of purely passive spring systems are calculated in such a way that low torques will cause the transmission elements to use some of the available spring travel to deflect with respect to each other. Even at maximum torque, however, some of this original spring travel remains unused. In the case of the inventive active gas spring system, the characteristic is adjusted continuously to the specific torque present at the moment, which results in a "virtual" multiplication of the available spring travel. The quality with which this torsional vibration damper isolates vibrations is correspondingly high, and its resonance frequency is correspondingly low, so low, in fact, that it is outside the typical rpm range of a vehicle under normal driving conditions.

If resonance behavior develops in spite of the previously mentioned low resonance frequency of the torsional vibration damper, the pressure in the reservoir can be raised to a level or held at a level at which relative rotation between the rotatable transmission elements of the torsional vibration damper is at least mostly prevented. Damage to the damping device is thus effectively avoided also.

In spite of the extremely long effective spring travel of the inventive torsional vibration damper, the actual amount of space required for the gas spring system and its mass moment of inertia are both small. Beyond this advantage, which is available in any case, the spring travel can be increased even more without the loss of the previously mentioned advantages by providing an additional reservoir, which is assigned to the pressure circuit of the gas spring system and which effectively increases the size of the reservoir of the gas spring system. This additional reservoir is connected to the reservoir in terms of pressure and provides a significant increase in the effective volume of the latter, and if it is located spatially outside the area over which the torsional vibration damper extends, preferably even in a stationary area of the motor vehicle, it will not increase the size of the torsional vibration damper or its mass moment of inertia. Increasing the effective volume of the reservoir by adding the additional reservoir to it correspondingly reduces the spring stiffness required to handle the torque, thereby allowing vibrational isolation of extremely high quality to be achieved. Because of the low mass of the gaseous medium moving between the reservoir and the additional reservoir, increasing the volume of the reservoir in this way leads to practically no increase in inertia.

In a highly advantageous embodiment, an oscillating compressor is assigned to the additional reservoir. With this oscillating compressor, it is possible to generate desirable gas pressure variations, which can help to overcome the effective friction between the cylinder space, which includes the reservoir, and the piston of the gas spring system and thus make it easier for relative movement to occur between these components. This advantage can be expanded by using the control system to control the oscillating compressor in such a way that it provides the functionality of a supplemental pump with a short effective range. Thus the pressure in both the reservoir and the additional reservoir can be increased independently of the main pump and/or of the reservoirs for gaseous medium connected to that pump.

The oscillating compressor can also be used to produce gas pressure fluctuations which produce frequent changes in the stiffness of the gas spring system for the purpose of suppressing the development of resonance in the torsional vibration damper. If resonance should develop in spite of this measure, an actuator such as a valve may be assigned to the oscillating compressor. This actuator is connected to the control system to perform certain regulating functions. If this actuator is closed when resonance occurs or at least when wide load changes occur, a pressure level which simulates high stiffness remains preserved in the gas spring system. This pressure thus prevents maximum relative rotational deflections between the two transmission elements. The oscillating compressor can be designed as a reciprocating piston compressor.

A pressure connection between an at least essentially stationary pressure circuit, which possibly includes the additional reservoir, and the transmission elements of the torsional vibration damper which can rotate around a common axis of rotation, i.e., the gas spring system, can be advantageously established by at least one rotary lead-through. This can be assigned either to the drive or to the takeoff.

The advantage of assigning the rotary lead-through to the drive is that only a single lead-through is required. This can be provided, for example, in a flange of a rotating part of the drive, e.g., the crankshaft. In this case, a bore for the passage of gaseous medium to the drive-side transmission element of the torsional vibration damper and thus to the gas spring system is provided in the flange of the crankshaft. So that the gaseous medium passing through this passage can flow onward to the gas spring system, a feed line assigned to the drive-side transmission element is provided.

If the stationary pressure circuit is assigned to the takeoff, at least two rotary lead-throughs are required, namely, a first one between the pressure circuit and the takeoff and a second between the takeoff and the drive-side transmission element, which, with respect to its movement, belongs to the drive. Nevertheless, it may be necessary to use this design instead of the previous design which assigns the pressure circuit to the drive, and which, requires only one rotational channel, when it is impossible to subject the rotating part of the drive, i.e., the crankshaft, to the measures required to produce the rotary lead-through and/or no space is available there for the pressure circuit.

To bridge the relative rotational movement between the takeoff and the stationary pressure circuit, the first rotary lead-through can be provided on the takeoff-side of the gearshift mechanism which serves to change the reduction ratio, provided that the takeoff passes completely through the gearshift mechanism in the axial direction. Alternatively, the rotary lead-through can be provided in the clutch bell and thus on the drive side of the gearshift mechanism.

The second rotary lead-through is preferably centered by the drive-side transmission element, so that, by means of integrated bearing and/or sealing elements versus the takeoff, it can in turn act as a pilot bearing which centers the takeoff versus the drive. To prevent leaks, it is advantageous for these bearing and/or sealing elements to serve simultaneously as seals.

The pressure circuit, which is pressure-connected to the gas spring system, preferably has a supply reservoir, which can be filled with gaseous medium to a predetermined density by a pump. Because of this supply reservoir, it is possible to increase the pressure very quickly in the reservoir and/or, if an additional reservoir is present between the reservoir and the supply reservoir, to increase the pressure in the additional reservoir also. An actuator such as a valve can be assigned to the supply reservoir to control this increase in pressure. It is advisable to use a valve with an adjustable flow cross section and to provide the control system of the pressure circuit with the ability to control that cross section.

The pressure circuit can be designed as a closed or as an open supply system. In the case of a closed supply system, the pressure in the reservoir and/or, if an additional reservoir is provided between the reservoir and the supply reservoir, the pressure in the additional reservoir is let off into an expansion reservoir. Conversely, in an open supply system, the pressure from the pressure circuit is let off into the atmosphere, referred to below as the "environment". In both cases, an actuator such as a valve is provided between the reservoir and/or the additional reservoir and the expansion reservoir or the environment. Here, too, it is advisable to use a valve with an adjustable flow cross section, which can be adjusted by the control system of the pressure circuit.

Another actuator of this type is present in a closed supply system, namely, to adjust the volume flow rate of gaseous medium between the expansion reservoir and the supply reservoir, where the medium leaving the expansion reservoir is compressed by the intermediate pump before it is fed into the supply reservoir. The intermediate pump draws gaseous medium from the environment only in an amount sufficient to make up for the losses caused by leakage. In an open supply system, however, the latter actuator can be omitted, because all of the gaseous medium sent to the supply reservoir is drawn from the environment and compressed by the pump.

The advantage of the closed supply system is its lower energy consumption, whereas the advantage of the open supply system is that it does not require the expansion reservoir.

The gas spring system is advantageously used in combination with an additional spring system, in which preferably steel springs are used. Like the additional spring system, the gas spring system can be in working connection with the drive-side transmission element and/or with the takeoff-side transmission element, preferably in a series type of connection, where the gas spring system is advantageously in working connection with the additional spring system by means of an intermediate transmission element.

The gas spring system is preferably designed to transmit higher torques than the additional spring system. The gas spring system can be mounted with an axial offset from the additional spring system. When the gas spring system is located functionally between the drive-side transmission element and the intermediate transmission element, the torque delivered by the drive is transmitted via the additional spring system provided on the takeoff-side until the drive-side torque reaches a predetermined level. The gas spring system remains at least essentially undeformed during this phase. In this operating state, furthermore, the mass moment of inertia of the drive-side transmission element is increased by the gas spring system. When the torque of the drive increases beyond the predetermined torque level, the additional spring system, which has now used up all of its spring travel, will rotate in common with the takeoff-side transmission element and increase the mass moment of inertia of that element. Because the takeoff is thus steadied, the quality of the vibrational isolation is improved. The torque is then transmitted exclusively via the gas spring system.

In contrast, installing the gas spring system functionally between the intermediate transmission element and the takeoff-side transmission element leads to an increase in the mass moment of inertia of the takeoff-side transmission element as soon as the predetermined torque level is exceeded. This has the effect of steadying the drive in cases where the drive-side torque and thus the degree of irregularity of the drive are high.

At least the essential part of the gas spring system can be installed with a radial offset from the additional spring system. It is especially advantageous, however, for the gas spring system to be installed in a position essentially radially outside the additional spring system. This leads to the advantage that the gas spring system serving to transmit the higher torques is installed on a larger diameter than the additional spring system.

A throttle connection which bridges the piston of the associated gas spring system's cylinder, especially a throttle connection which bridges the plunger of the piston, is preferably assigned to the cylinder space. The throttling action of the throttle can be adjusted by an actuator, which can be controlled by the control system. This throttle connection proceeds essentially between two of the gas-filled chambers of the cylinder space, where preferably the first chamber is a piston rod chamber on one side of the piston plunger, and the second chamber is the reservoir on the opposite side of the piston plunger. As long as there are no load variations, the throttle connection can remain preferably closed, so that the pressure does not equalize between the two chambers of the cylinder space. In the presence of relatively large load variations, however, opening the throttle connection at least partially allows gaseous medium to flow from the reservoir to the piston rod space, as a result of which energy is dissipated and the desired damping is obtained. An advantage of this process is that the flow of gaseous medium into the piston rod space creates a higher pressure level there, and thus not only the reservoir but also the piston rod space provide a buffering action consistent with an elastic gas stop spring.

Because a throttle connection of this type between the reservoir and the piston rod space is close to the cylinder, it has the effect of suppressing large amplitudes of the relative rotational deflection between the drive-side and takeoff-side transmission elements of the torsional vibration damper, especially when the load changes occur very quickly, in that the previously mentioned buffering effect effectively counteracts the after-oscillations of the transmission elements.

The throttle connection itself can be integrated either into the cylinder space or outside it, such as in the form of a separate line. The actuator for adjusting the throttling effect is preferably designed as a valve, which can be passive, i.e., nonadjustable. Preferably, however, the valve is active and can therefore be adjusted by the control system, especially in an amplitude-selective manner, that is, in correlation with the degree of the rotational deflection between the two transmission elements.

In terms of design, the gas spring system advantageously has a pressure space, filled with viscous medium, which extends between the piston plunger and a separating piston, which isolates the pressure space from the reservoir. The viscous medium of the pressure space provides an optimum seal between the gaseous medium-filled chambers, that is, the piston rod space and the reservoir. In addition, the viscous medium ensures the permanent lubrication of any seal which may be assigned to the piston. The lubrication of the seal has the essential goal of minimizing the "break-loose" moment of the seal, i.e., the moment at which the piston is no longer stuck in place by the friction between the seal and the associated wall of the cylinder and is free to move. As a result, the piston can be deflected softly in response to even the very smallest load changes. The previously mentioned oscillating compressor can also be used to achieve the same goal. That is, the compressor can be used to generate an appropriately cycling, i.e., oscillating, column of gaseous medium, which prevents the piston plunger from adhering via its seal to the cylinder wall.

As previously mentioned, a plurality of reservoirs is preferably assigned to the pressure circuit of the gas spring system, including, for example, a supply reservoir and an expansion reservoir. As a result, the energy contained in the gas spring system can be stored essentially free of loss, but it is also possible to call up energy very quickly in a continuously variable manner or to resupply energy in a continuous manner. In addition, these reservoirs can be designed in any desired way and thus located in any desired place in the vehicle. In most cases, they will be located outside the torsional vibration dampers, which guarantees excellent utilization of the available space.

The cost of the gas spring system can be reduced and its technical reliability increased by using technology already present in the vehicle. An example of such technology is a compressor which may already be present in the vehicle's air-conditioning system or in a variable damping system for the chassis. Such a compressor can also be used as a pump for the pressure circuit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
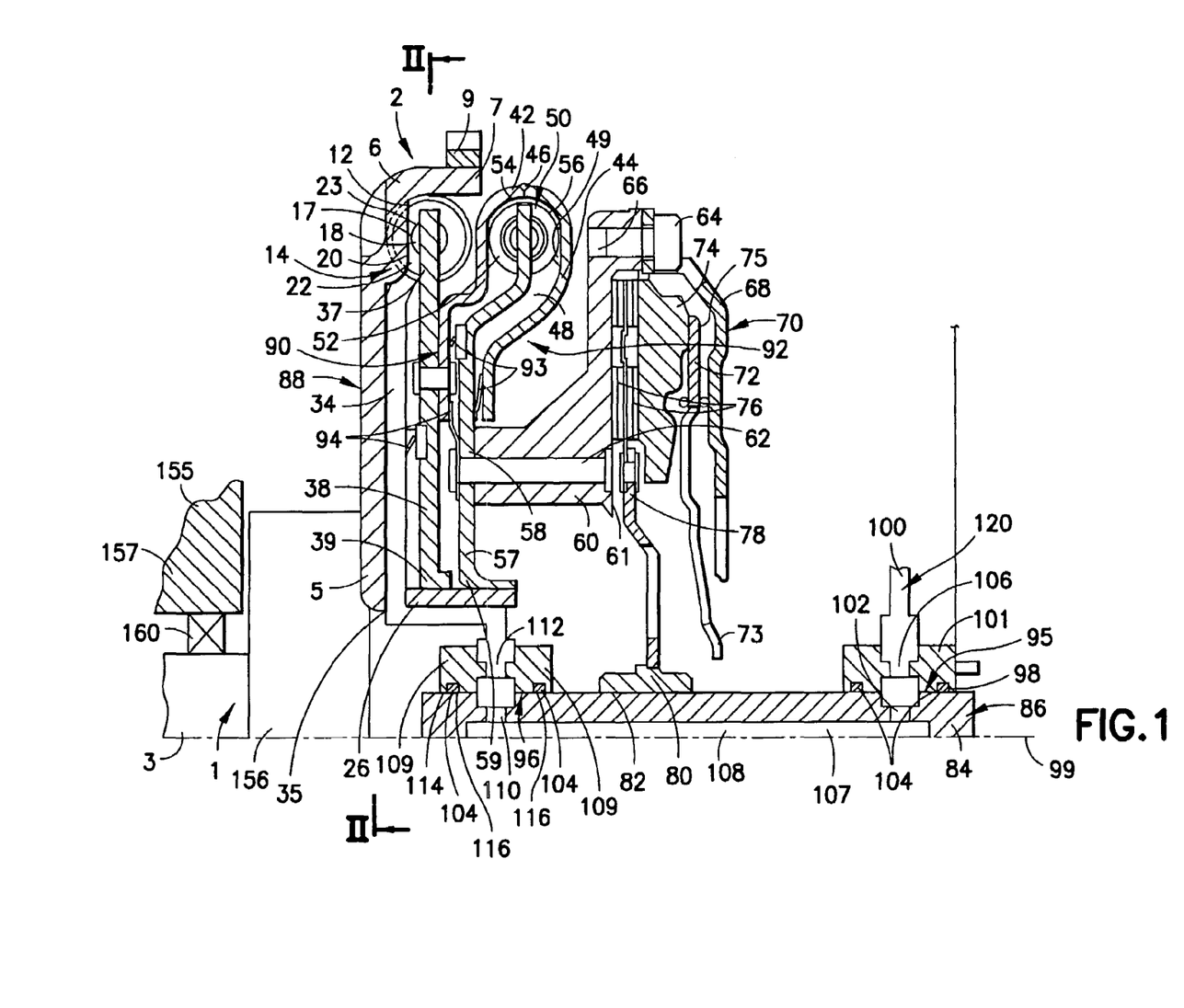
FIG. 1 is a cross sectional view of a torsional vibration damper with a gas spring system, supplied by two pressure transfer points and combined with an additional, axially adjacent spring system.
Figure 2:
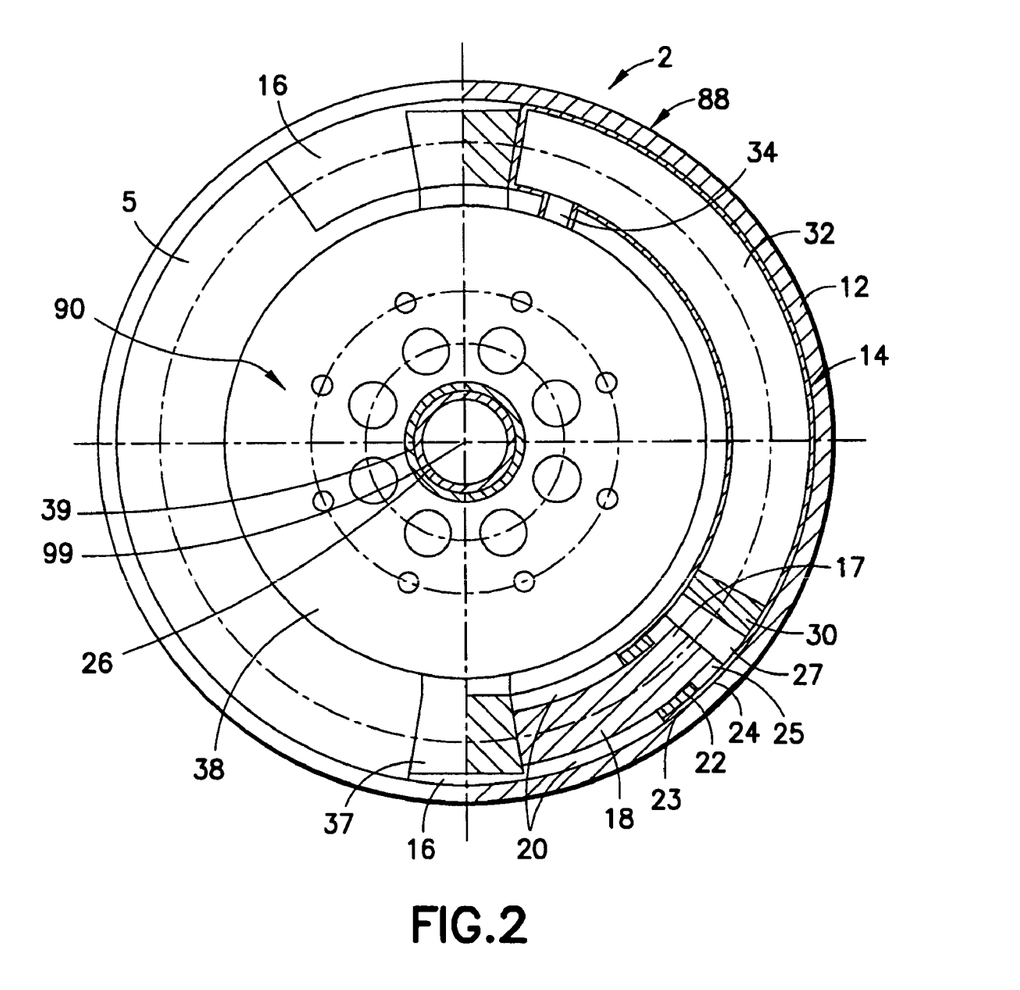
FIG. 2 is a cross sectional view along line II-II in FIG. 1.

FIGS. 1 and 2 show a torsional vibration damper 2, which, as can be seen FIG. 1, is intended to be connected for rotation in common to a drive 1. The drive 1 is preferably an internal combustion engine, in which a housing 157 serves as a stationary part 155 of the drive 1, and a crankshaft 3 serves as the rotating part 156 of the drive 1. FIG. 1 also shows in schematic fashion a bearing 160, by means of which the rotating part 156 is centered in an essentially frictionless manner with respect to the stationary part 155. The bearing 160 is intended to represent one of a plurality of bearing elements (not shown) provided for the drive 1, namely, the bearing element which is closest in the axial direction to the torsional vibration damper 2.

To attach the torsional vibration damper 2 nonrotatably to the crankshaft 3, the torsional vibration damper 2 has a radial flange 5, adjacent to the crankshaft 3. In its radially outermost area, this flange merges with an axial shoulder 7, which carries a toothed ring 9.

The radially inner area of the radial flange 5 is used to connect (not shown) the torsional vibration damper 2 to the crankshaft 3. The radially outer area of the radial flange 5 is designed to hold a gas spring system 14, which will be explained in detail below with reference to FIG. 2. The radial flange 5 is in working connection with a cylinder space 12 of the gas spring system 14 by way of a drive-side primary control element 16, which is worked into the flange. For the sake of clarity, half of FIG. 2 shows a gas spring system 14, whereas the other half shows the radial flange 5 and the drive-side primary control element 16. Of course, a gas spring system 14 would also be present in the other half of the figure.

As FIG. 2 shows more clearly, the cylinder space 12 of the gas spring system 14 holds a piston 17 with a piston rod 18, which extends through a piston rod space 20. The piston 17 also has a piston plunger 25. The geometry of the edge 24 of the plunger is adapted at least essentially to the cross-sectional form of the cylinder space 12. The design according to FIG. 1 and FIG. 2 is based on an essentially circular cross-sectional shape of the piston plunger 25 and of the cylinder space 12.

The piston rod 18 of the piston 17 extends in the circumferential direction through an opening 23 in a seal 22, which is provided on the piston rod side of the piston plunger 25. The opposing circumferential side of the piston plunger 25 forms the boundary of a pressure space 27 within the cylinder space 12, the other circumferential boundary of which is formed by a separating piston 30. The side of the separating piston facing away from the pressure space 27 forms a boundary of a reservoir 32 within the cylinder space 12. A feed line 34 leads into this reservoir 32, preferably at a considerable circumferential distance from the separating piston 30. As FIG. 1 shows, this feed line is attached to the radial flange 5 and leaves the essentially ring-shaped area of the torsional vibration damper 2 in the radially inward direction via an opening 35 in a radial flange hub 26, which is assigned to the radial flange 5 and forms its radially inner boundary.

FIGS. 1 and 2 also show that the piston rod 18 of the piston 17 is in working connection with a takeoff-side primary control element 37 in the form of an intermediate disk 38, which is mounted by an intermediate disk base 39 on the previously mentioned radial flange hub 26. This intermediate disk 38 carries nonrotatably a first cover plate 42, which cooperates with a second cover plate 44, joined to it by a weld 46, to form a holding space 48 for an additional spring system 50. In the present exemplary embodiment, the spring system 50 includes steel springs 52, which can be controlled by secondary drive-side control elements 49 provided on the holding space 48. The additional spring system 50 has slideways 54, by which it is supported radially on the outside so that it can travel along a guide track 56 provided on the holding space 48. The circumferential side of the spring system facing away from the drive-side secondary control elements 49 acts on a hub disk 57, which therefore acts as a takeoff-side secondary control element 58, and which is mounted on the radial flange hub 26 by a hub disk base 59. The hub disk 57 carries non-rotatably a ring mass 60 in which axial holes 61 are provided to accept rivets 62 for attachment to the hub disk 57. On the other side, the ring mass 60 has threaded bores 66 in the radially outer area, into which screws 64 can be introduced to attach the clutch housing 68 of a friction clutch 70 to the ring mass 60. In a manner known in and of itself, the friction clutch 70 is designed with a diaphragm spring 72. A clutch-release mechanism (not shown) controls the engagement and disengagement of the clutch by actuating the radially inward-pointing spring tongues 73 of the diaphragm spring.

When the diaphragm spring produces axial force at its radially outward ring area 75 directed toward the ring mass 60, a pressure plate 74 is pushed toward the ring mass 60 so that friction linings 76 of a clutch disk 78 located axially between the ring mass 60 and the pressure plate 74 are clamped together nonpositively for the transmission of torque. The friction clutch 70 is thus now in the engaged state. The clutch disk 78 has a hub 80 in the radially inner area. This hub 80 is mounted rotatably but with freedom of axial movement on a gearbox input shaft 84 by way of a set of teeth 82. This gearbox input shaft either forms the takeoff 86 or is a component of it.

The drive-side transmission element 88 of the torsional vibration damper 2 is formed essentially by the radial flange 5, including the feed line 34, and the gas spring system 14. An intermediate transmission element 90 of the torsional vibration damper 2 is formed by the intermediate disk 38 and the holding space 48. A takeoff-side transmission element 92 of the torsional vibration damper 2 is formed by the hub disk 57 together with the ring mass 60 and the friction clutch 70.

It should also be pointed that axial sealing means 93 are provided in the holding space 48, radially inside the additional spring system 50. These sealing means are required in cases where the holding space 48 is at least partially filled with viscous medium for the sake of lubrication and velocity-proportional damping of the additional spring system. In addition, axial spacers 94 are provided between the drive-side transmission element 88 and the intermediate transmission element 90 and also between the intermediate transmission element 90 and the takeoff-side transmission element 92. These spacers are intended to keep the individual transmission elements 88, 90, 92 in elastic but predetermined relative positions with respect to each other in the axial direction.

The torsional vibration damper 2 works by pressure connection 100 with a pressure circuit 120, shown merely in schematic fashion in FIG. 1. The design of the pressure circuit 120 is provided in more detail below on the basis of FIGS. 3 and 8. It can be seen in FIG. 1, however, that the feed line 100 of the pressure circuit 120 is in working connection with the gearbox input shaft 84 and therefore with the takeoff 86 by way of a first pressure transfer point 95, and that the takeoff 86, in the form of the gearbox input shaft 84, is in turn in working connection with the feed line 34 by way of a second pressure transfer point 96. Like the drive 1 and the takeoff 86, the two pressure transfer points 95, 96 are oriented around the axis of rotation 99.

The first pressure transfer point 95 has a first pressure circuit component 101, which has a radial passage 106 to connect it to the feed line 100. Like the feed line 100, the first pressure circuit component is at least essentially stationary. The gearbox input shaft 84 is able to rotate relative to this first pressure circuit component 101. The gearbox input shaft 84 shaft itself has a first radial section 102 by which a pressure connection is established with the first pressure circuit component 101. To prevent the loss of gaseous medium such as compressed air at the transition between the first pressure circuit component 101 and the gearbox input shaft 84, bearing and/or sealing means 104 are provided on both axial sides of the radial channel 106, namely, on the radial side of the first pressure circuit component 101 facing the gearbox input shaft 84. To this extent, the gearbox input shaft 84 also serves as a pressure circuit component.

The radial section 102 of the gearbox input shaft 84 is pressure-connected with a central opening 108 in the form of an integrated pressure line 107, which extends essentially in the axial direction and is provided inside the gearbox input shaft 84. This pressure line 107 leads to another radial section 110 of the gearbox input shaft 84 in the area of the drive-side end of the gearbox input shaft 84. This radial section 110 is pressure-connected with a radial passage 112 in a second pressure circuit component 109 which belongs to the second pressure transfer point 96. The second pressure circuit component 109 is designed with bearing and/or sealing means 104 on both axial sides of the radial section 110 and the radial passage 112 on the radial side of the second pressure circuit component 109 facing the gearbox input shaft 84. To ensure the unhindered transfer of pressure between the radial passage 112 of the second pressure circuit component 109 and the feed line 34, the second pressure circuit component 109 moves at least essentially concomitantly with the feed line 34 and thus with the drive-side transmission element 88, so that it is also necessary to assume relative movement here between the second pressure circuit component 109 and the gearbox input shaft 84. In the embodiment shown here, furthermore, the additional benefit is obtained that the gearbox input shaft 84 is centered by the second pressure circuit component 109 in conjunction with the feed line 34 and the radial flange hub 26. In particular, the bearing and/or sealing means 104 in the pressure circuit component 109 act as a pilot bearing 116 for the gearbox input shaft 84. Overall, therefore, the first pressure transfer point 95 serves as a first rotary lead-through 98, whereas the second pressure transfer point 96 serves as a second rotary lead-through 114.

Figure 9:
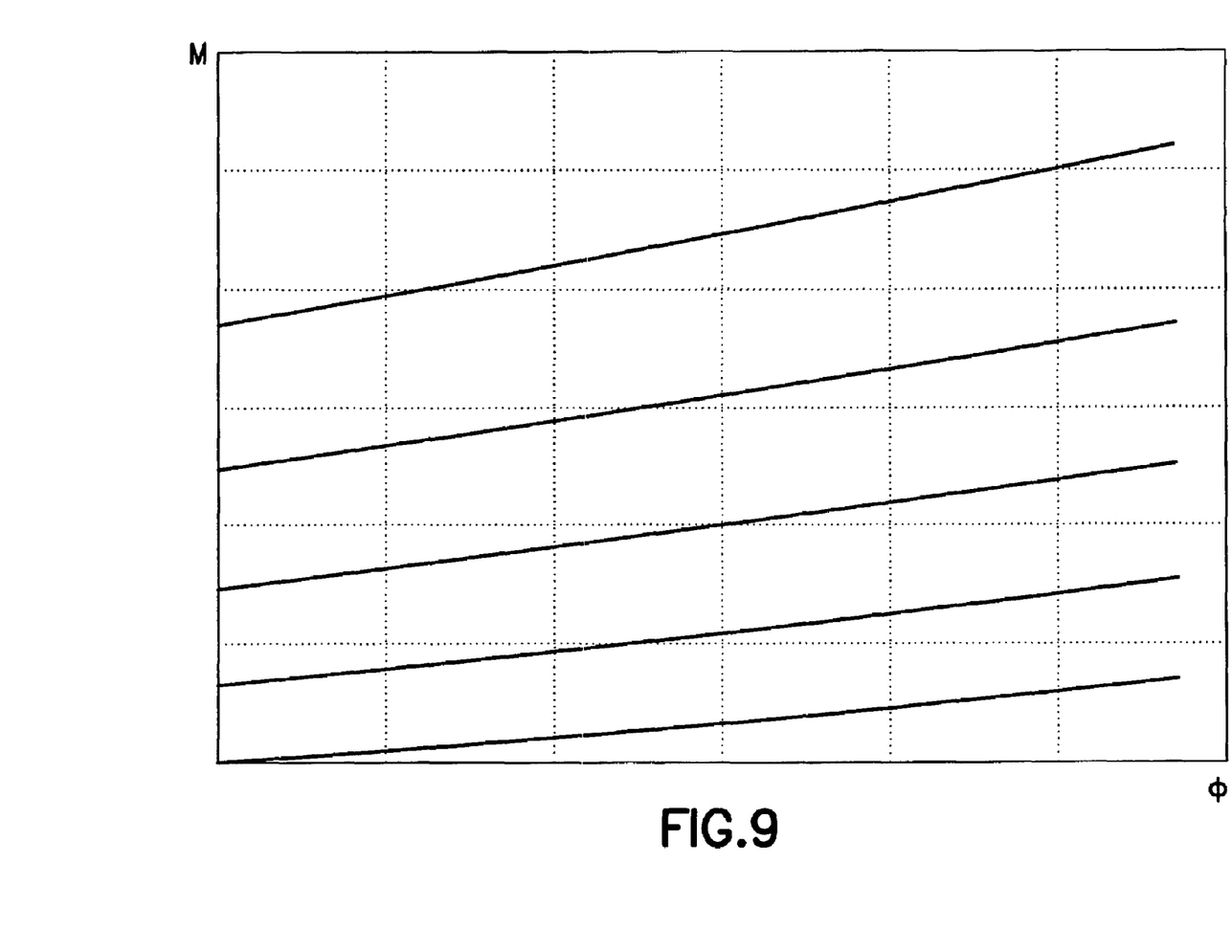
FIG. 9 shows a characteristic curve diagram of the gas spring system.

Gaseous medium which has been introduced via the feed line 100 of the pressure circuit 120 passes first through the first pressure transfer point 95 into the central opening 108 in the gearbox input shaft 84 and then arrives at the second pressure transfer point 96, from which it then flows via the feed line 34 into the gas spring system 14. The higher the pressure in the reservoir 32 of the gas spring system 14 as a result of the introduction of gaseous medium, the greater the capacity of this gas spring system 14 to transmit torque. The characteristic of the gas spring system 14, shown in FIG. 9, is therefore adapted to the amount of torque to be transmitted at the moment in question by adjusting the pressure prevailing in the reservoir 32 (FIG. 2). As a result of this adjustment, a characteristic is obtained which is optimal for the load state present at that exact moment, so that in all cases almost the entire spring travel which the gas spring system 14 with this characteristic can offer is available for the damping of any torsional vibrations which may have been caused by load alternations. Of course, an additional increase in load can be compensated by increasing the pressure in the reservoir 32 even more to realize an even higher characteristic, whereas a decrease in load will be compensated by decreasing the pressure in the reservoir 32 to realize a lower characteristic. It remains to be noted that the characteristic curves in FIG. 9 show the torque M as a function of the deflection angle φ of the gas spring system 14. The transition from one characteristic curve to another can be accomplished in stages or steps of predetermined size or in an essentially continuous manner.

Figure 10:
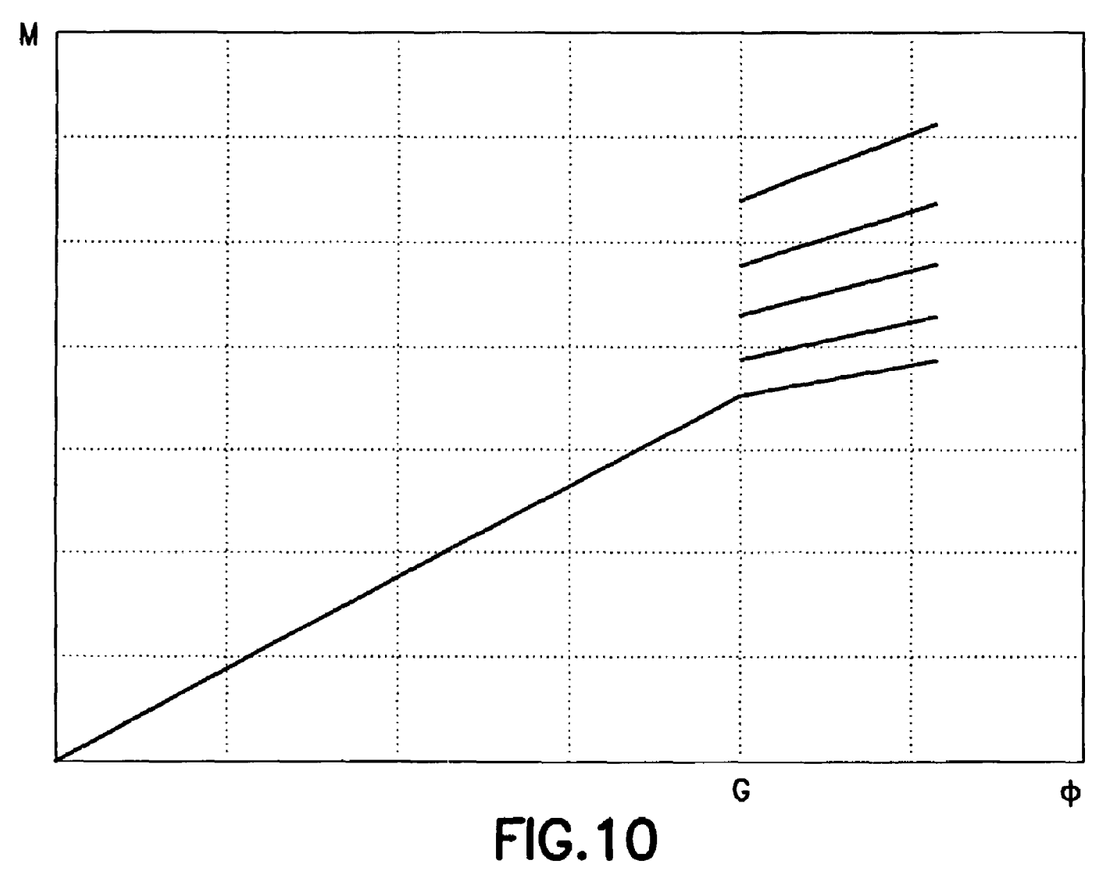
FIG. 10 shows a characteristic curve diagram of the gas spring system in conjunction with a characteristic curve of the additional spring system.

The overall characteristic of the torsional vibration damper 2 is shown in FIG. 10, where again the torque M is shown as a function of the deflection angle φ of the gas spring system 14. The characteristic in FIG. 10 is based on the idea that the additional spring system 50 has only one characteristic, which defines the functionality of the torsional vibration damper until the drive produces a predetermined torque, shown in FIG. 10 by the limit angle φG. Until this predetermined torque is reached, the gas spring system 14 undergoes essentially no deformation. When this predetermined torque is exceeded, however, the additional spring system has no more spring travel available. From this point on, therefore, starting with the limit angle φG, the characteristic curve situation of the gas spring system 14 described above on the basis of FIG. 9 goes into effect.

In contrast to the reservoir 32, in which gaseous medium is present, the opposite side of the separating piston 30, that is, the pressure space 27, is filled with viscous medium, which not only allows the immediate transmission of a movement of the piston 17 to the separating piston 30 but also provides lubrication for the piston 17 and the seal 22, as a result of which the friction-induced adhesion of the edge of the piston plunger 24 to the inside wall of the cylinder space 12 is decreased. The piston rod space 20 surrounding the piston rod 18, finally, can either be filled with gaseous medium or left pressureless, i.e., connected to the "environment", for example, normal ambient atmosphere.

Figure 3:
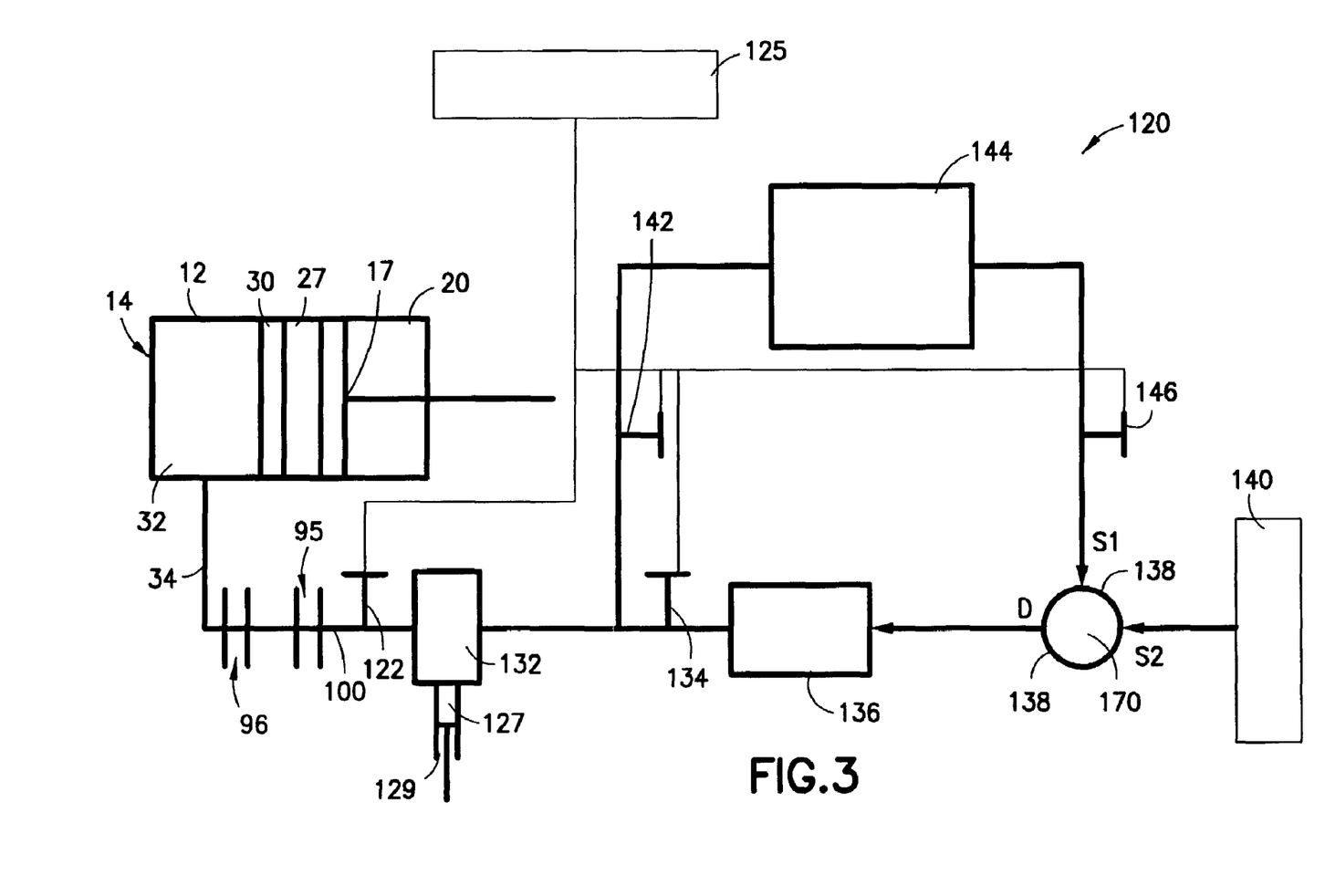
FIG. 3 is a schematic diagram of an embodiment of a pressure circuit, designed as a closed supply system for the gas spring system of FIG. 1.

The pressure circuit for the gas spring system according to an embodiment of the invention is illustrated in FIG. 3. A first actuator 122 is installed next to the drive-side pressure transfer point 95. This first actuator 122 is connected to an open-loop and/or closed-loop control device 125, which can adjust the position of the first actuator 122. In the following, the open-loop and/or closed-loop control device 125 is referred to in brief as the control unit 125. This first actuator 122 is used to adjust the pressure connection to an additional reservoir 132. Opening the first actuator 122 allows the volume of the reservoir 32 of the gas spring system 14 to increase. When the first actuator 122 is closed, however, the volume of the reservoir 32 cannot be changed. Because the additional reservoir 132, like the feed line 100, is stationary, the reservoir 32, which moves along with the drive-side transmission element 88 of the torsional vibration damper 2, can be kept compact, which is important when there are critical space limitations on the damper, and instead the corresponding volume can be provided by the additional reservoir 132. The larger volume for gaseous medium available in the reservoir 32 in conjunction with the additional reservoir 132 has the effect of creating a gas spring functionally equivalent to a conventional steel spring torsional vibration damper with an extremely large amount of spring travel. The additional reservoir 132, furthermore, increases the spring travel without causing any disadvantageous side effects. Supplementally, an oscillating air column can be produced by the oscillating compressor 127. This oscillating column produces an even greater reduction in the previously mentioned friction-caused adhesion of the edge 24 of the plunger of the piston 17 in the cylinder space 12. The oscillating compressor 127, when properly controlled by, for example, the control unit 125, can also be used to increase the pressure or to decrease it in the additional reservoir 132 and thus ultimately also in the reservoir 32 in an almost instantaneous manner or at least very quickly.

The additional reservoir 132 is connected to a discharge port D of a pump 138 by a second actuator 134 and a supply reservoir 136. A predetermined positive pressure can be built up in the supply reservoir 136. The additional reservoir 132 is also connected to a first suction port S1 of the pump 138 by a third actuator 142, an expansion reservoir 144, and a fourth actuator 146. The actuators 134, 142, and 146 are each connected to the control unit 125, so that the degree to which they open can be adjusted. The second actuator 134 is controlled to adjust the filling of the additional reservoir 132 with gaseous medium from the supply reservoir 136, and the third actuator 142 is controlled to adjust the emptying of the additional reservoir 132 into the expansion reservoir 144. Adjusting the fourth actuator 146, finally, determines the percentage of gaseous medium which arrives at the discharge port D of the pump 138 via the suction port S1 versus the percentage of gaseous medium which arrives via the second suction port S2 of the pump 138. For example, it is possible in this way to use the second suction port S2 to make up for any losses of gaseous medium which may have occurred at the first suction port S1 of the pump 138. These losses are made up from the environment 140, which, when air is used as the gaseous medium, may be the normal ambient atmosphere. When some other gaseous medium is used, however, an isolated reservoir tank can be used. When air is used as the gaseous medium, the pump 138 acts as a compressed air source 170.

Figure 4:
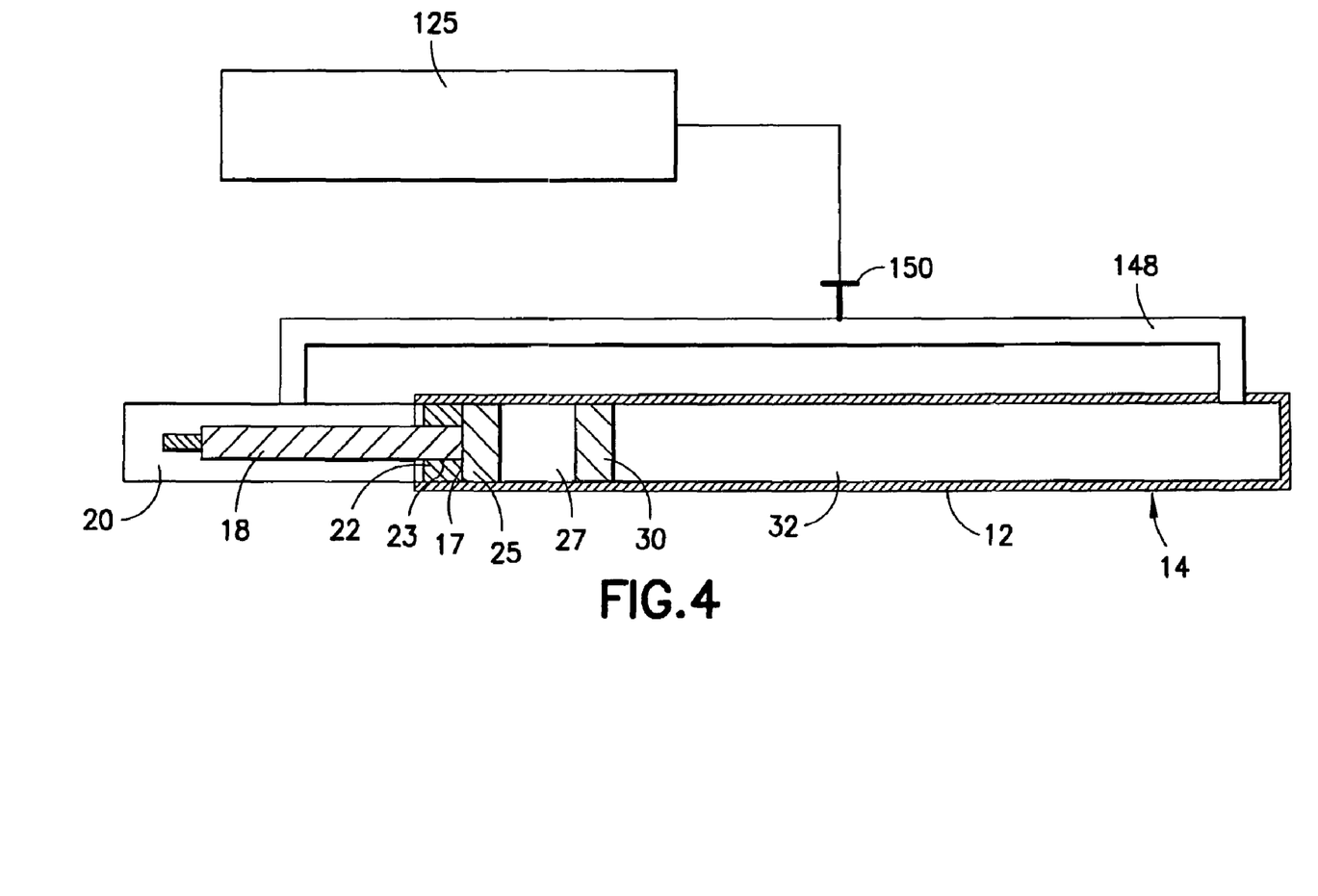
FIG. 4 shows a schematic diagram of the gas spring system of FIG. 1, provided with a throttle connection.
Figure 8:
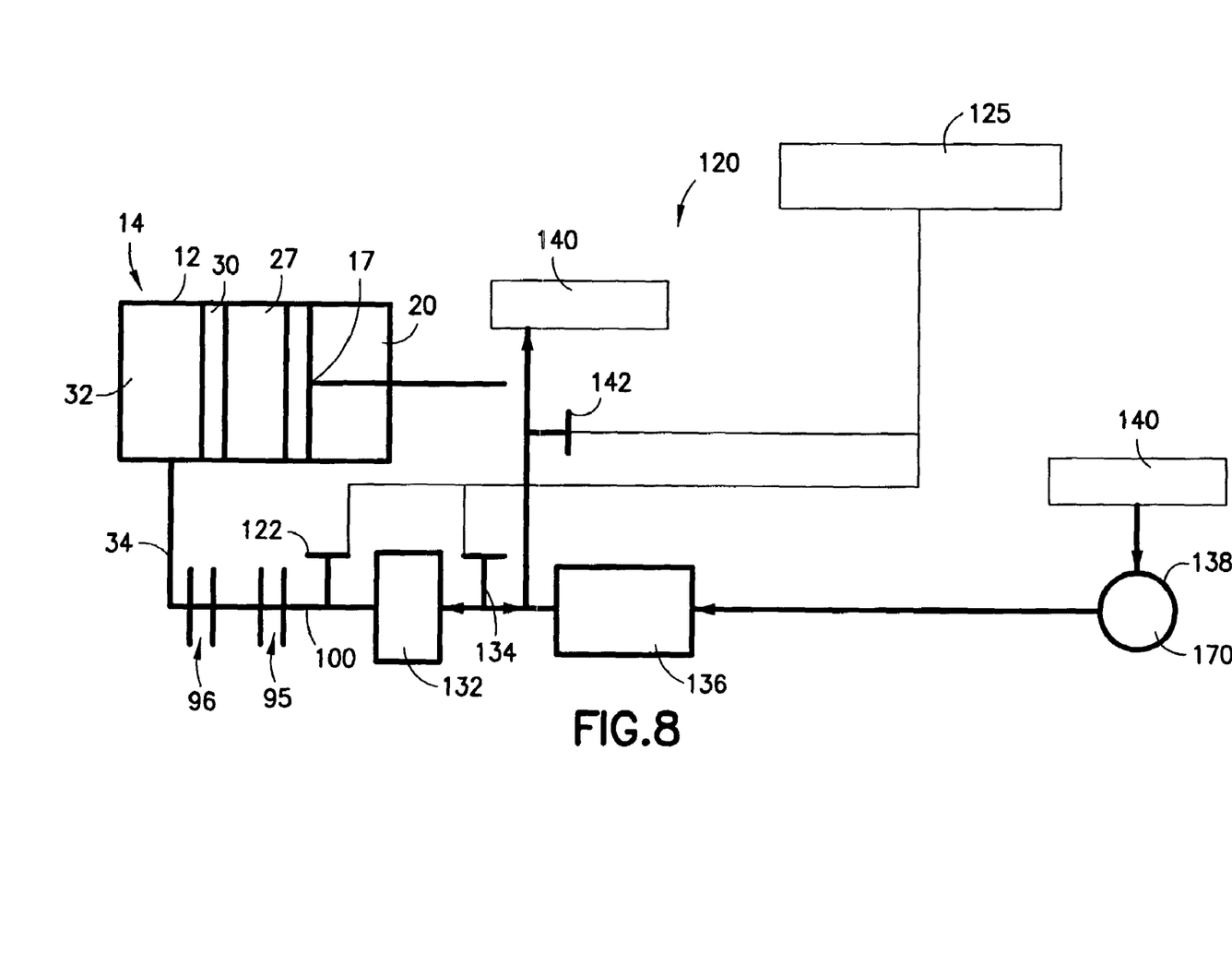
FIG. 8 is a schematic diagram of another embodiment of a pressure circuit designed as an open supply system.

In FIG. 3 the pressure circuit 120 is designed as a closed supply system, in which only the losses of gaseous medium are made up from the environment 140. The pressure circuit 120 according to FIG. 8 is an open supply system, in which all of the gaseous medium which leaves the additional reservoir 132 is discharged into the environment 140, and all of the gaseous medium which is to be supplied to the additional reservoir 132 via the supply reservoir 136 is taken by the pump 138 from the environment 140. FIG. 4 shows a special design of the gas spring system 14, where a throttle connection 148 is present between the reservoir 32 and the piston rod space 20. This throttle connection 148 can be adjusted by an actuator 150, which is connected to the control unit 125. Accordingly, a damping function is achieved, in that a column of the gaseous medium is forced to pass through the throttle connection 148 and is thus subjected to a throttling action. In addition, by building up the pressure in the piston rod space 20 as well, a counter-buffer can be created, which acts like a stop spring opposing the reservoir 32. This is advantageous especially in cases of rapid alternating loads, when it is desirable for the piston to be damped on both sides so that it will return quickly to an intermediate position.

Figure 5:
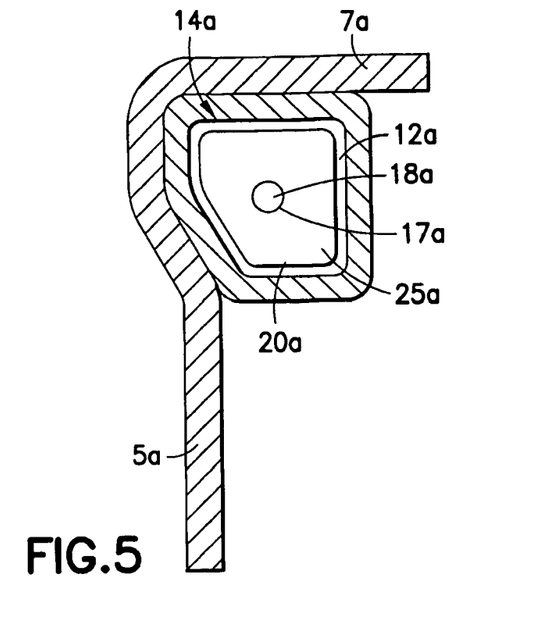
FIG. 5 is a partial sectional view of a gas spring system according to FIG. 1 with a polygonal cross section.
Figure 6:
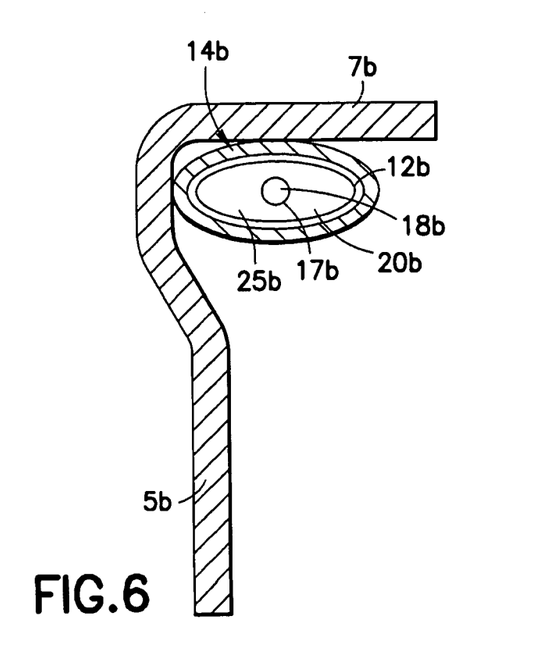
FIG. 6 is a partial sectional view of a gas spring system as in FIG. 1 with an elliptical cross section.

FIGS. 5 and 6 correspond essentially to the embodiment according to FIG. 1 with respect to the design of the gas spring system 14, but they show different cross-sectional geometries. In FIG. 5, the reference characters of elements similar to the embodiment of FIG. 1 have the same reference characters with a suffix "a". In FIG. 6, the reference characters of elements similar to the embodiment of FIG. 1 have the same reference characters with a suffix "b" In FIG. 5, for example, the plunger 25a of the piston 17a and its edge 24a have a polygonal design, and the cylinder space 12a also has a corresponding polygonal shape. In comparable fashion, FIG. 6 shows a design with an elliptical geometry. These geometries make it possible to adapt the gas spring system 14a, 14b optimally to the space available for the torsional vibration damper 2.

Figure 7:
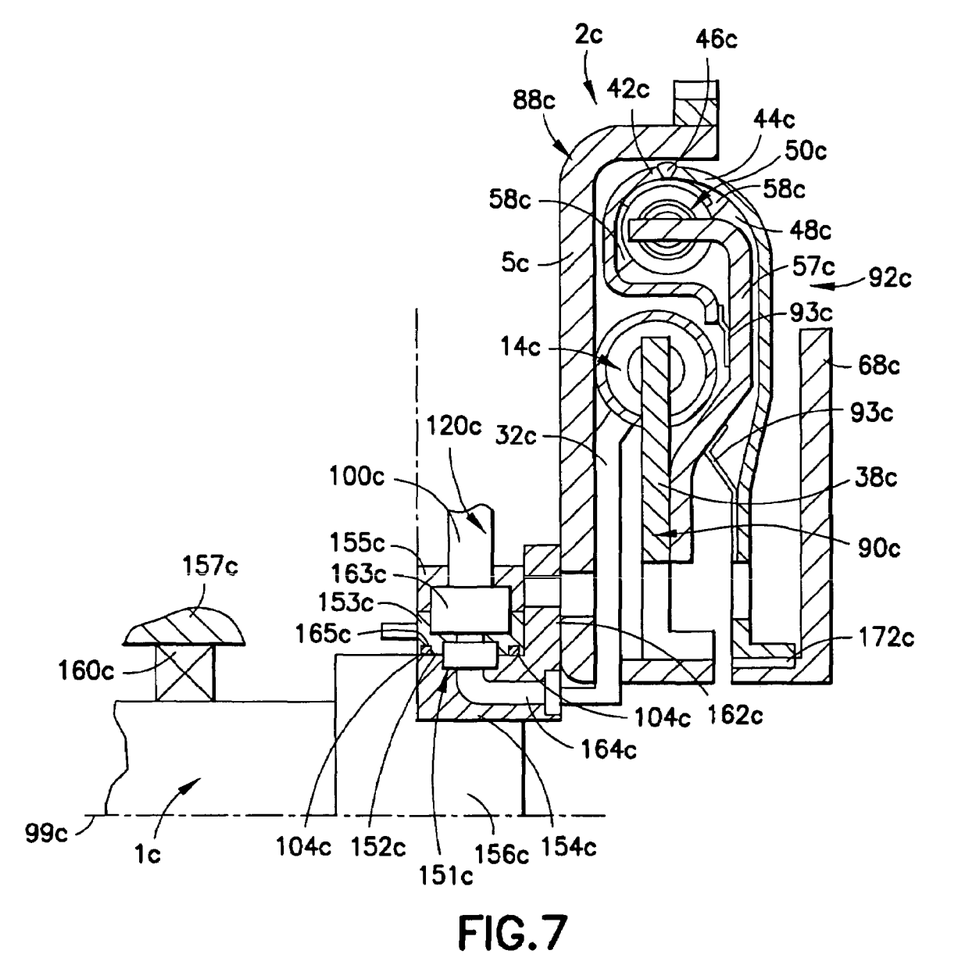
FIG. 7 is a cross sectional view of a torsion vibration damper with only one pressure transfer point between the pressure circuit and the gas spring system, the latter being located with a radial offset from the additional spring system.

FIG. 7 shows essentially a design of a pressure transfer point 151c which is different from pressure transfer points 95, 96 of FIG. 1. In FIG. 7, the reference characters of elements similar to the embodiment of FIG. 1 have the same reference characters with a suffix "c". A first pressure circuit component 153c of the pressure transfer point is at least essentially non-rotatable with respect to the stationary part 155c of the drive 1c, i.e., with respect to the housing 157c. A second pressure circuit component 154c of the pressure transfer point 151c moves essentially in common with the rotating part 156c of the drive 1c, i.e., with its crankshaft 3c. Bearing and/or sealing means 104c are provided at the point of relative movement between the two pressure circuit components 153c, 154c, namely, on both axial sides of a radial channel 163c, which passes through the first pressure circuit component 153c. These same sealing means 104c are also located on both axial sides of the radial inlet to a supply elbow 164c in the second pressure circuit component 154c. This supply elbow 164c leads to the feed line 34c of the gas spring system 14c. In this design, the second pressure circuit component 154c has a radially outward-directed support flange 162c, to which the radial flange 5c of the drive-side transmission element 88c is attached. The advantage of a pressure transfer point 151c of this type on the drive side of the torsional vibration damper 2c is that only this one pressure transfer point 151c is needed. Nevertheless, this type of design can be used only when the internal combustion engine in question also has the appropriate design, namely, a design in which the crankshaft 3c projects axially beyond the housing 157c of the internal combustion engine.

The design according to FIG. 7 also departs from that of FIG. 1 in that, in the case of FIG. 7, the intermediate disk 38c actuated by the piston rod 18c of the piston 17c of the gas spring system 14c cooperates with the hub disk 57c to form the intermediate transmission element 90c, so that now the hub disk 57c serves as the drive-side secondary control element 49c. In this design, therefore, the takeoff-side secondary control elements 58c for the additional spring system 50c are provided on the cover plates 42c and 44c. Consequently, the cover plates 42c, 44c, in common with a clutch housing 68c, which is connected nonrotatably but with freedom of axial movement to the takeoff-side cover plate 44c by means of a set of teeth 172c, act as the takeoff-side transmission element 92c. In contrast to FIG. 1, however, the clutch housing 68c in the design shown in FIG. 7 is preferably a part of a clutch device (not shown), such as that used in conjunction with a power shift mechanism. A clutch device of this type is known in and of itself from, for example, from U.S. Pat. No. 6,491,149 and thus requires no further explanation here.

In the design shown in FIG. 7, only axial sealing means 93c are required, provided that viscous medium is present in the holding space 48c. Because both of the two axial sealing means 93c act in the same direction, namely, in the direction toward the drive 1c, the axial spacers 94 shown in FIG. 1 can be omitted.

On comparison of FIG. 1 with FIG. 7, it is evident that, as a function of the predetermined amount of space available for the torsional vibration damper 2, the gas spring system 14 and the additional spring system 50 can be offset either axially (FIG. 1) or, radially (FIG. 7) from each other. Similarly, of course, the positions of the gas spring system 14 and of the additional spring system 50 with respect to the drive-side transmission element 88 and the takeoff-side transmission element 92 may also be switched if desired.

With respect to the additional spring system 50, it remains to be noted that, when the system is designed with steel springs 52, it can obviously have slideways 54 of the type illustrated and described in the previously mentioned U.S. Pat. No. 5,307,710.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper for transmitting torque between a drive and a takeoff, said torsional vibration damper comprising:
   a drive-side transmission element connectable to the drive and rotatable about an axis of rotation;
   a takeoff-side transmission element connectable to the takeoff and rotatable about the axis of rotation;
   a damping device installed between said drive-side transmission element and said takeoff-side transmission element, wherein said takeoff-side transmission element is rotationally deflectable relative to said drive-side transmission element against an urgency of said damping device, said damping device comprising a gas spring system transmitting torque between said drive-side transmission element and said takeoff-side transmission element, said gas spring system having a reservoir containing gaseous medium, wherein a characteristic of said gas spring system being changeable in response to a pressure in said reservoir; and
   a pressure circuit connected to said reservoir of said gas spring system, said pressure circuit being actuatable to adjust a pressure in said reservoir such that said characteristic of said gas spring system is adaptable to a torque applied to said torsional vibration damper, said pressure circuit comprising a plurality of pressure circuit components and at least one pressure transfer point communicating the gaseous medium under pressure between two of said pressure circuit components which are moveable relative to each other, wherein said pressure circuit comprises a first feed line, at least a portion of the takeoff, a second feed line connected to said reservoir, a first pressure transfer point providing a first connection between said first feed line and said at least a portion of said takeoff, and a second pressure transfer point providing a second connection between said at least a portion of said takeoff and said second feed line.

2. The torsional vibration damper of claim 1, wherein a component of said first pressure transfer point comprises a first rotary lead-through which is sealingly connected to said pressure circuit and to said at least a portion of said takeoff.

3. The torsional vibration damper of claim 1, wherein a component of said second pressure transfer point comprises a second rotary lead-through which is sealingly connected to said reservoir of said gas spring system and to said at least a portion of said takeoff.

4. A torsional vibration damper for transmitting torque between a drive and a takeoff, said torsional vibration damper comprising:
   a drive-side transmission element connectable to the drive and rotatable about an axis of rotation;
   a takeoff-side transmission element connectable to the takeoff and rotatable about the axis of rotation;
   a damping device installed between said drive-side transmission element and said takeoff-side transmission element, wherein said takeoff-side transmission element is rotationally deflectable relative to said drive-side transmission element against an urgency of said damping device, said damping device comprising a gas spring system transmitting torque between said drive-side transmission element and said takeoff-side transmission element, said gas spring system having a reservoir containing gaseous medium, wherein a characteristic of said gas spring system being changeable in response to a pressure in said reservoir; and a pressure circuit connected to said reservoir of said gas spring system, said pressure circuit being actuatable to adjust a pressure in said reservoir such that said characteristic of said gas spring system is adaptable to a torque applied to said torsional vibration damper, said pressure circuit comprising a plurality of pressure circuit components and at least one pressure transfer point communicating the gaseous medium under pressure between two of said pressure circuit components which are moveable relative to each other, wherein said at least one pressure transfer point of said pressure circuit includes at least one of a bearing and a sealing element arranged between said two of said pressure circuit components which are moveable relative to each other.

5. The torsional vibration damper of claim 4, wherein said drive-side transmission element comprises a radial flange hub, said at least one pressure transfer point of said pressure circuit having said at least one of a bearing and a sealing element being radially enclosed by said radial flange hub such that said at least one pressure transfer point acts as a pilot bearing centering the takeoff on the drive.

6. The torsional vibration damper of claim 4, wherein said at least one of a bearing and a sealing element comprises a seal.

7. The torsional vibration damper of claim 4, wherein said pressure circuit comprises an additional reservoir connectable with said reservoir of the gas spring system.

8. A torsional vibration damper for transmitting torque between a drive and a takeoff, said torsional vibration damper comprising:
a drive-side transmission element connectable to the drive and rotatable about an axis of rotation;
a takeoff-side transmission element connectable to the takeoff and rotatable about the axis of rotation;
a damping device installed between said drive-side transmission element and said takeoff-side transmission element, wherein said takeoff-side transmission element is rotationally deflectable relative to said drive-side transmission element against an urgency of said damping device, said damping device comprising a gas spring system transmitting torque between said drive-side transmission element and said takeoff-side transmission element, said gas spring system having a reservoir containing gaseous medium, wherein a characteristic of said gas spring system being changeable in response to a pressure in said reservoir;
a pressure circuit connected to said reservoir of said gas spring system, said pressure circuit being actuatable to adjust a pressure in said reservoir such that said characteristic of said gas spring system is adaptable to a torque applied to said torsional vibration damper, said pressure circuit comprising an additional reservoir connectable with said reservoir of the gas spring system; and
an oscillating compressor connected with said additional reservoir.

9. A torsional vibration damper for transmitting torque between a drive and a takeoff, said torsional vibration damper comprising:
a drive-side transmission element connectable to the drive and rotatable about an axis of rotation;
a takeoff-side transmission element connectable to the takeoff and rotatable about the axis of rotation;
a damping device installed between said drive-side transmission element and said takeoff-side transmission element, wherein said takeoff-side transmission element is rotationally deflectable relative to said drive-side transmission element against an urgency of said damping device, said damping device comprising a gas spring system transmitting torque between said drive-side transmission element and said takeoff-side transmission element, said gas spring system having a reservoir containing gaseous medium, wherein a characteristic of said gas spring system being changeable in response to a pressure in said reservoir;
a pressure circuit connected to said reservoir of said gas spring system, said pressure circuit being actuatable to adjust a pressure in said reservoir such that said characteristic of said gas spring system is adaptable to a torque applied to said torsional vibration damper, said pressure circuit comprising an additional reservoir connectable with said reservoir of the gas spring system; and
at least one of supply reservoir and an expansion reservoir connectable to said additional reservoir.

10. The torsional vibration damper of claim 9, further comprising said supply reservoir, said expansion reservoir, and a pump having a discharge port connected to said supply reservoir and a first suction port connected to said expansion reservoir.

11. The torsional vibration damper of claim 10, further comprising a first actuator selectively connecting said additional reservoir to said reservoir of said gas spring system, a second actuator selectively connecting said additional reservoir to said supply reservoir, a third actuator selectively connecting said additional reservoir to one of said expansion reservoir and the environment, and a fourth actuator selectively connecting said first suction port of said pump to said expansion reservoir.

12. The torsional vibration damper of claim 11, wherein said pump further comprises a second suction port connected to the environment.

13. The torsional vibration damper of claim 12, wherein the gaseous medium filling said gas spring system is compressed air obtainable from one of a compressed air source and the environment through said second suction port of said pump.

14. The torsional vibration damper of claim 11, further comprising a control device connected to adjust a position of at least one of said first, second, third, and fourth actuators.

15. The torsional vibration damper of claim 9, further comprising said supply reservoir, said expansion reservoir, a first actuator selectively connecting said additional reservoir to said reservoir of said gas spring system and a second actuator selectively connecting said additional reservoir to said supply reservoir.

16. The torsional vibration damper of claim 15, further comprising a third actuator selectively connecting said additional reservoir to one of said expansion reservoir and the environment.

17. A torsional vibration damper for transmitting torque between a drive and a takeoff, said torsional vibration damper comprising:
a drive-side transmission element connectable to the drive and rotatable about an axis of rotation;

a takeoff-side transmission element connectable to the takeoff and rotatable about the axis of rotation;

a damping device installed between said drive-side transmission element and said takeoff-side transmission element, wherein said takeoff-side transmission element is rotationally deflectable relative to said drive-side transmission element against an urgency of said damping device, said damping device comprising a gas spring system transmitting torque between said drive-side transmission element and said takeoff-side transmission element, said gas spring system having a reservoir containing gaseous medium, wherein a characteristic of said gas spring system being changeable in response to a pressure in said reservoir;

a pressure circuit connected to said reservoir of said gas spring system, said pressure circuit being actuatable to adjust a pressure in said reservoir such that said characteristic of said gas spring system is adaptable to a torque applied to said torsional vibration damper, said pressure circuit comprising an additional reservoir connectable with said reservoir of the gas spring system; and a first actuator selectively connecting said additional reservoir to said reservoir of said gas spring system.

18. A torsional vibration damper for transmitting torque between a drive and a takeoff, said torsional vibration damper comprising:

a drive-side transmission element connectable to the drive and rotatable about an axis of rotation;

a takeoff-side transmission element connectable to the takeoff and rotatable about the axis of rotation;

a damping device installed between said drive-side transmission element and said takeoff-side transmission element, wherein said takeoff-side transmission element is rotationally deflectable relative to said drive-side transmission element against an urgency of said damping device, said damping device comprising a gas spring system transmitting torque between said drive-side transmission element and said takeoff-side transmission element and an additional spring system connected in series with said gas spring system, said gas spring system having a reservoir containing gaseous medium, wherein said gas spring system is connected with said drive-side transmission element and said additional spring system is connected with said takeoff-side transmission element, and wherein a characteristic of said gas spring system being changeable in response to a pressure in said reservoir; and a pressure circuit connected to said reservoir of said gas spring system, said pressure circuit being actuatable to adjust a pressure in said reservoir such that said characteristic of said gas spring system is adaptable to a torque applied to said torsional vibration damper, wherein said drive-side transmission element comprises a radial flange mounted nonrotatably with respect to the drive, said gas spring system comprising a drive-side primary control element connected to said drive-side transmission element and a takeoff-side primary control element, said takeoff-side primary control element comprising an intermediate transmission element between said gas spring system and said additional spring system, a cylinder space containing said reservoir of said gas spring system defined by drive-side primary control element, a piston moveable in a circumferential direction in said cylinder space, and a feed line leading to said reservoir, and wherein said cylinder space and said feed line are connected with said drive-side primary control element, and said piston is connected with said takeoff-side primary control element.

19. The torsional vibration damper of claim 18, wherein said additional spring system comprises a drive-side secondary control element and a takeoff-side secondary control element, said intermediate transmission element being connected with said additional spring system by said drive-side secondary control element, said additional spring system being connected with said takeoff-side transmission element by said takeoff-side secondary control element.

20. The torsional vibration damper of claim 18, wherein said intermediate transmission element defines a holding space radially enclosing the additional spring system and defining an axial boundary of said additional spring system.

21. A torsional vibration damper for transmitting torque between a drive and a takeoff, said torsional vibration damper comprising:

a drive-side transmission element connectable to the drive and rotatable about an axis of rotation;

a takeoff-side transmission element connectable to the takeoff and rotatable about the axis of rotation;

a damping device installed between said drive-side transmission element and said takeoff-side transmission element, wherein said takeoff-side transmission element is rotationally deflectable relative to said drive-side transmission element against an urgency of said damping device, said damping device comprising a gas spring system transmitting torque between said drive-side transmission element and said takeoff-side transmission element, said gas spring system having a reservoir containing gaseous medium, wherein a characteristic of said gas spring system being changeable in response to a pressure in said reservoir;

a pressure circuit connected to said reservoir of said gas spring system, said pressure circuit being actuatable to adjust a pressure in said reservoir such that said characteristic of said gas spring system is adaptable to a torque applied to said torsional vibration damper; and an additional spring system connected in series with said gas spring system, wherein said additional spring system is arranged at a position in said torsional vibration damper that is essentially axially offset from said gas spring system.

22. A torsional vibration damper for transmitting torque between a drive and a takeoff, said torsional vibration damper comprising:

a drive-side transmission element connectable to the drive and rotatable about an axis of rotation;

a takeoff-side transmission element connectable to the takeoff and rotatable about the axis of rotation;

a damping device installed between said drive-side transmission element and said takeoff-side transmission element, wherein said takeoff-side transmission element is rotationally deflectable relative to said drive-side transmission element against an urgency of said damping device, said damping device comprising a gas spring system transmitting torque between said drive-side transmission element and said takeoff-side transmission element, said gas spring system having a reservoir containing gaseous medium, wherein a characteristic of said gas spring system being changeable in response to a pressure in said reservoir, wherein said gas spring system comprises a cylinder defining a cylinder space containing said reservoir of said gas spring system, a piston moveable in a circumferential direction in said cylinder space, said piston comprising a piston rod and a plunger; and a pressure circuit connected to said reservoir of said gas spring system, said pressure circuit being actuatable to adjust a pressure in said reservoir such that said characteristic of said gas spring system is adaptable to a torque applied to said torsional vibration damper.

23. The torsional vibration damper of claim 22, wherein said damping device further comprises an additional spring system connected in series with said gas spring system.

24. The torsional vibration damper of claim 23, wherein said gas spring system is connected with said drive-side transmission element and said additional spring system is connected with said take-off side transmission element.

25. The torsional vibration damper of claim 23, wherein said gas spring system is connected with said take-off side transmission element and said additional spring system is connected with said drive-side transmission element.

26. The torsional vibration damper of claim 23, wherein said additional spring system is arranged at a position in said torsional vibration damper that is essentially radially offset from said gas spring system.

27. The torsional vibration damper of claim 22, wherein said gas spring system is responsive to torque input from both said drive-side transmission element and said take-off side transmission element.

28. The torsional vibration damper of claim 22, wherein said plunger of said piston acts on a pressure space essentially filled with a viscous medium, said pressure space is bounded on a circumferential side facing away from said plunger by a separating piston, and a side of said separating piston facing away from said pressure space is adjacent to said reservoir.

29. The torsional vibration damper of claim 28, further comprising a seal arranged in said cylinder space, wherein said piston rod passes through said seal and projects into a piston rod space of said cylinder space, wherein said seal limits the mixing of the viscous medium in said pressure space with the gaseous medium of the piston rod space, and said separating piston limits the mixing of the viscous medium in said pressure space with the gaseous medium of said reservoir.

30. The torsional vibration damper of claim 29, said cylinder space of said gas spring system and said piston rod are both designed as segments of circular arcs extending in a circumferential direction.

31. The torsional vibration damper of claim 29, further comprising a throttle connection connecting said reservoir of said gas spring system and said piston rod space, said throttle connection bypassing said pressure space.

32. The torsional vibration damper of claim 31, further comprising an actuating element for selectively adjusting the throttling action of said throttle connection.

33. The torsional vibration damper of claim 32, further comprising a control device connected to said actuating element of said throttle connection.

34. The torsional vibration damper of claim 22, wherein a cross-sectional shape of said cylinder space comprises one of an essentially circular, elliptical, or polygonal cross section, and an edge of said plunger conforms to said cross-sectional shape of said cylinder space.

* * * * *